UNITED STATES PATENT OFFICE.

HEINRICH ERNST ESCH, OF GIESSEN, GERMANY, ASSIGNOR TO THE FIRM OF FELLNER & ZIEGLER, OF FRANKFORT-ON-THE-MAIN, BOCKENHEIM, GERMANY.

PROCESS OF PREPARING DUST ORES FOR BLAST-FURNACES.

No. 801,143.     Specification of Letters Patent.     Patented Oct. 3, 1905.

Application filed May 1, 1905. Serial No. 258,392.

*To all whom it may concern:*

Be it known that I, HEINRICH ERNST ESCH, a subject of the German Emperor, and a resident of Giessen, Germany, have invented certain new and useful Improvements in Processes of Preparing Dust Ores for Blast-Furnaces, of which the following is a specification.

This invention relates to the well-known process of preparing iron ores of fine grain and sandy texture, or ore-dust, for the blast-furnace, which consists in forming such ore-dust into agglomerated masses or balls, so as to utilize thereby the iron-ore dust hitherto but seldom used, owing to the disadvantages accompanying its use in the blast-furnace. Iron-ore dust is obtained, first, by the handling of hard iron ores for the blast-furnace, by which small splinters are broken off and dust is formed; secondly, as by-products in certain processes—as, for instance, the process of manufacturing sulfuric acid; thirdly, by the preparation of certain ores for the blast-furnace—as, for instance, the valuable spathic iron ore, (ferrous carbonate,) which being subjected to heat is decomposed, whereby carbonic acid is liberated and the ore caused to crumble to dust; fourthly, in the operation of many blast-furnaces large quantities of ore-dust are carried away by the current of waste gases and collected in the tubes and flues of the blast-furnace, and, lastly, many ores occur in nature in soft, earthy, and loamy form. These ores and others herein not specially referred to contain such large quantities of iron that their metallurgical reduction becomes highly desirable and profitable. The said known process overcomes these inherent disadvantages and consists in feeding the ore-dust to the ingoing end of an inclined rotatory furnace, subjecting said ore-dust to a gradually-increasing heat during its passage through the furnace until agglomeration or slagging takes place, and removing the agglomerated masses at the outgoing end of the furnace.

The present invention is differentiated from the said process in embodying the feature of agglomerating ore-dust of high fusibility, which is not readily capable of being fused or agglomerated, by the employment of the process described above or by other means hitherto proposed.

The operation of this improved process is similar to that of the process described above, and reference is herewith made thereto.

Many ores in the form of ore-dust are highly desirable to be reduced and for this reason advantageous to be transformed from their dusty state to agglomerated masses or balls. Hitherto, however, owing to the high fusibility of certain ores—as, for instance, Swedish and other magnetic iron ores—it was extremely difficult to cause their agglomeration or fusion, and if such was actually accomplished it was only by the use of a comparatively large supply of fuel and heat, and therefore commercially impracticable.

The object of the present invention is to bring ore-dust obtained from ores of high fusibility into the desired form applicable for their working in the blast-furnace by agglomerating the same by means of the heat produced by an ignited stream of coal-dust.

For this purpose the invention consists in feeding ore-dust of high fusibility to the ingoing end of an inclined rotatable furnace, subjecting said ore-dust to a gradually-increasing heat during its passage through the furnace, fusing and agglomerating said ore-dust together with an easily-fusible material only at a definite part of the furnace, and removing the agglomerated masses at the outgoing end of the furnace.

The invention consists more especially in subjecting the ore-dust of high fusibility for fusing, agglomerating, or slagging the same to an ignited stream of coal-dust mixed with a flux or material of low fusibility; and the invention consists, lastly, of mixing with the coal-dust of the ignited stream an easily-fusible ore and projecting the ignited particles of coal-dust mixed with the particles of ore-dust against the ore-dust of high fusibility passing through the furnace.

To carry out my invention, ore-dust is fed in quantitively exact portions into the upper end of an inclined rotatable furnace and owing to the rotation of the furnace and inclination of the same is gradually moved from the upper end of the furnace toward the lower end. An ignited stream of combustible gas, preferably coal-dust, impinges against the ore-dust near the lower accessible end of the furnace, the burning particles of coal of the stream of coal-dust being projected against the ore-dust, which is caused to be heated to a considerable extent, but owing to its high fusibility prevented from being fused or agglomerated with parts of the ore-dust in the furnace. By means of the intimate contact of the projecting burning particles of coal-dust with the particles of ore-dust in the furnace the resulting ashes of the coal-dust mix with the particles of ore-dust and serve as a flux tending to aid the fusion of the same. The radiated heat of the ignited stream of combustible gas or coal-dust, as the case may be, subjects the ore-dust of the upper not accessible part of the furnace to a process of drying, calcining, and preheating. In order to effect the fusion of this heated ore-dust of high fusibility, quantities of a material in dusty form are brought into the zone of agglomeration, which either serve directly in energetically assisting the agglomeration of the ores of high fusibility or by their own fusion or agglomeration cause the mutual adhesion of the particles of ore-dust in the lower end of the furnace, and thereby the baking of the ore-dust resisting fusion or agglomeration in such a manner that it is formed into lumps, bodies, or hard broken pieces and ready to be discharged from the furnace in this state.

In the execution of the process the additions intended to serve as flux or binding material are intimately mixed with the coal-dust intended for the ignited stream and are projected against the ore-dust or may also be by means of a special supply device forced into the furnace with the combustion-air. A preferable form of execution of the improved process is to add to the coal-dust or to the combustion-air of the ignited stream an easily-fusible ore—as, for instance, easily-fusible brown hematite or brown iron ore or the by-products had by the preparation of iron or manganese ores (ore slimes) or by mixing easily-fusible iron slags in dusty form and then directing the same with the burning coal particles toward the critical point in the agglomeration zone of the furnace. The easily-fusible ore intimately mixed with the burning coal fuses on its way to the ore-dust of the furnace in the ignited stream and encounters in this partly-fused or fused condition the ore-dust in the furnace. This fused ore serves for inciting a certain agglomeration of the ore-dust and causing thereby the fusion and slagging of the same, its principal action, however, being that it acts to a certain extent as a binding medium, which binds that not yet entirely agglomerated or fused ore-dust into large pieces, lumps, or layers, forming crusts along the interior walls of the furnace. If the latter should form, they may be readily removed in the known manner.

When it is desirable to utilize the flue-dust of the blast-furnace consisting of iron-ore in dusty form and particles of those materials charged to the blast-furnace with the iron-ore in order to effect its reduction, it is necessary to bring the flue-dust into a form applicable for its reduction in the blast-furnace. This is done in the case of flue-dust of high fusibility by feeding the same into the upper end of the inclined rotatable furnace in the known manner and causing its agglomeration at the critical point of the rotatable furnace. Flue-dust of low fusibility is utilized by mixing the same with the coal-dust particles intended for the ignited stream and projecting the ignited stream of this mixture against the ore-dust passing through the rotatable furnace, and thereby causing its agglomeration.

Having thus described my invention, I claim as new and desire to secure by Letters Patent—

1. The process of preparing ore-dust of high fusibility for the blast-furnace which consists in feeding the ore by a rotating advancing action first through a region of gradually-increasing heat, and then into a region where it is subjected to a stream of ignited fuel mixed with an easily-fusible material, thereby agglomerating it, and finally removing the resulting agglomerated masses.

2. The process herein described of preparing ore-dust of high fusibility for the blast-furnace which consists in feeding the ore-dust by a rotating advancing action first to a region of gradually-increasing heat, then into a region where it is subjected to a stream of ignited coal-dust mixed with an easily-fusible ore-dust, thereby agglomerating it in said region, and finally removing the resulting agglomerated masses.

In testimony whereof I have signed my name to this specification in the presence of two subscribing witnesses.

HEINRICH ERNST ESCH.

Witnesses:
　FRANZ HASSLACHER,
　ERWIN DIPPEL.